United States Patent
Yuasa

(10) Patent No.: US 9,447,827 B2
(45) Date of Patent: Sep. 20, 2016

(54) CLUTCH WITH BUILT-IN TORSIONAL VIBRATION DAMPER

(75) Inventor: Tsuneyoshi Yuasa, Kobe (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 1175 days.

(21) Appl. No.: 13/420,435

(22) Filed: Mar. 14, 2012

(65) Prior Publication Data

US 2012/0246943 A1  Oct. 4, 2012

(30) Foreign Application Priority Data

Mar. 31, 2011 (JP) ................................. 2011-077662

(51) Int. Cl.
| | | |
|---|---|---|
| *F16D 43/14* | (2006.01) | |
| *A01D 34/90* | (2006.01) | |
| *B27B 5/38* | (2006.01) | |
| *F16F 15/123* | (2006.01) | |

(52) U.S. Cl.
CPC ............. *F16D 43/14* (2013.01); *A01D 34/905* (2013.01); *F16F 15/1234* (2013.01); *F16F 15/12313* (2013.01); *F16D 2043/145* (2013.01)

(58) Field of Classification Search
CPC ... A01D 34/905; F16D 43/14; F16D 43/145; F16D 2043/145; B27B 5/38; F16F 15/12313; F16F 15/1234
USPC ..... 464/66.1, 68.1; 192/55.61, 212, 105 CD, 192/105 CE, 103 B
See application file for complete search history.

(56) References Cited

U.S. PATENT DOCUMENTS

| | | | | |
|---|---|---|---|---|
| 492,898 | A * | 3/1893 | Westinghouse ........... | F16D 3/66 464/62.1 |
| 1,317,232 | A * | 9/1919 | Spillman ................. | F16H 55/18 464/66.1 |
| 1,718,207 | A * | 6/1929 | Anibal ................... | F16F 15/123 464/68.1 |
| 2,069,132 | A * | 1/1937 | Clark ........................ | 192/55.61 |

(Continued)

FOREIGN PATENT DOCUMENTS

| | | |
|---|---|---|
| CN | 1366803 | 9/2002 |
| CN | 201174882 | 1/2009 |

(Continued)

OTHER PUBLICATIONS

Chinese Application No. 201210077379.7 Office Action dated Jan. 9, 2014, 7 pages with partial English translation.

(Continued)

*Primary Examiner* — Robert Hodge
*Assistant Examiner* — Terry Chau

(57) ABSTRACT

A torsional vibration damper equipped clutch (20) for a combustion engine (E) includes a clutch drum (32), coupled with a cutter blade (3) through a drive shaft (6), a clutch shoe (34) connected with a crankshaft (16) of the combustion engine (E) and capable of being connected with the clutch drum (32) by the effect of a centrifugal force. The clutch (20) further includes a flywheel (18) fixed to the crankshaft (16) by means of a nut (19), and a holder (36) connected with the flywheel (18) for relative movement in a circumferential direction through a helical compression spring (50). The clutch shoe (34) is supported by the holder (36), and a stopper structure (56) is provided between the flywheel (18) and the holder (36) for transmitting a rotational force of the combustion engine (E) to the holder (36).

16 Claims, 6 Drawing Sheets

(56) References Cited

U.S. PATENT DOCUMENTS

| | | | | |
|---|---|---|---|---|
| 2,102,524 | A | * | 12/1937 | Fieux .................... 192/105 CE |
| 3,050,166 | A | * | 8/1962 | Cunningham .......... F16D 41/22 |
| | | | | 192/31 |
| 3,329,245 | A | * | 7/1967 | Freber ........................ 192/55.61 |
| 4,690,257 | A | * | 9/1987 | Suzuki .................... F16D 43/18 |
| | | | | 192/105 BA |
| 6,754,962 | B2 | | 6/2004 | Warashina et al. |
| 7,480,998 | B2 | | 1/2009 | Suzuki et al. |
| 7,594,334 | B2 | | 9/2009 | Kocha |
| 2002/0095797 | A1 | | 7/2002 | Warashina et al. |
| 2006/0248731 | A1 | | 11/2006 | Suzuki et al. |
| 2007/0044321 | A1 | | 3/2007 | Kocha |
| 2008/0053783 | A1 | * | 3/2008 | Lean et al. ............. 192/105 CD |
| 2008/0264027 | A1 | | 10/2008 | Kaskawitz et al. |
| 2010/0000834 | A1 | | 1/2010 | Quartier et al. |

FOREIGN PATENT DOCUMENTS

| | | |
|---|---|---|
| JP | 2006-311828 | 11/2006 |
| JP | 2007-061029 | 3/2007 |
| JP | 2007-085406 | 4/2007 |
| JP | 2009-168107 | 7/2009 |
| JP | 2009-228756 | 10/2009 |
| WO | 2008/034431 | 3/2008 |

OTHER PUBLICATIONS

Japanese Application No. 2011-077662 Notice of Reasons for Rejection dated Apr. 21, 2015, 4 pages.

Japanese Application No. 2011-077662 Decision of Grant dated Jun. 9, 2015, 3 pages.

* cited by examiner

CLUTCH WITH BUILT-IN TORSIONAL VIBRATION DAMPER

CROSS REFERENCE TO THE RELATED APPLICATION

This application is based on and claims Convention priority to Japanese patent application No. 2011-077662, filed Mar. 31, 2011, the entire disclosure of which is herein incorporated by reference as a part of this application.

BACKGROUND OF THE INVENTION

1. Field of the Invention

The present invention relates to a centrifugal clutch for use mainly in a compact combustion engine used to drive a work machine such as, for example, a brush cutter.

2. Description of Related Art

In the compact combustion engine of a type utilizing a centrifugal clutch, the clutch starts engaging when the combustion engine attains the rotational speed of, for example, 3,800 rpm and is completely engaged when the combustion engine attains the rotational speed of about 7,000 rpm. It is, however, often experienced that during a semi-clutch period subsequent to the engagement of the clutch to the complete engagement of the same, a torsional vibration tends to be generated in, for example, a drive shaft and/or a clutch drum used to connect between the combustion engine and a load such as, for example, cutter blade. Such a torsional vibration occurs in the following manner by way of example.

When the clutch starts engaging incidental to an increase of the rotational speed of the combustion engine, the combustion engine is loaded with the cutter blade with the rotational speed of the combustion engine reduced consequently and, therefore, the clutch is likely to disengage. Even under this condition, the cutter blade continues its rotation by the effect of an inertia force. However, once the clutch is disengaged, the rotation of the cutter blade is lowered and the rotational speed of the combustion engine increases again, causing the clutch to be engaged again. At this time, the combustion engine is loaded with the cutter blade, accompanied by reduction in rotational speed of the combustion engine, which subsequently results in re-disengagement of the clutch. If the brush cutter is used during the semi-clutch period (with the rotational speed in a range of 3,800 to 7,000 rpm) referred to above, the clutch undergoes a cyclic repetition of engagement and disengagement in the manner described above and, due to a consequent change in rotational speed of the combustion engine and/or a change in torque, which are caused by the above discussed cyclic repetition, the torsional vibration occurs in the drive shaft and this leads to a body waggling of a main pipe used to support the drive shaft.

In an attempt to suppress the torsional vibration referred to above, the JP Laid-open Patent Publication No. 2009-228756 suggests the use of a torsional spring between the combustion engine and the clutch. In this combustion engine, a clutch shoe is supported through a torsional coil spring by a coupling shaft that is threadingly connected with an end portion of the output shaft of the combustion engine. The coupling shaft also functions as a connecting member for fixing a flywheel (rotor) to the output shaft. According to the above mentioned patent document, the torsional motion is absorbed by the torsional coil spring to thereby suppress the torsional vibration of the drive shaft.

It has, however, been found that since according to the above mentioned patent document the coupling shaft is threadingly connected with the end portion of the output shaft of the combustion engine and the clutch shoe is then supported by this coupling shaft, a spring force of the torsional spring acts on the coupling shaft as a rotating force while the coupling shaft receives the total weight of the clutch shoe. Accordingly, it may occur that the coupling shaft threadingly connected with the output shaft of the combustion engine may be loosened. Considering that the coupling shaft has a function as the connecting member for fixing the flywheel to the output shaft of the combustion engine, loosening of the coupling shaft in the manner described above results in a rattling motion taking place in the threaded connection between the coupling shaft and the output shaft of the combustion engine, accompanied by generation of obnoxious sounds brought about by vibrations of the flywheel. Also, the clutch may become unstable to such an extent as to amplify the vibrations.

SUMMARY OF THE INVENTION

The present invention has been devised with a view to substantially eliminating the above discussed problems and inconveniences and is intended to provide a torsional vibration damper equipped clutch, that is, a clutch having a torsional vibration damper built therein, which is effective to suppress the torsional vibration of the drive shaft.

In order to accomplish the foregoing object, the present invention provides a torsional vibration damper equipped clutch for a combustion engine includes a clutch drum coupled with a load through a drive shaft; a clutch shoe connected with a rotary shaft of the combustion engine and capable of being connected with the clutch drum by the effect of a centrifugal force; a flywheel fixed to the rotary shaft by means of a fixing member; a holder connected with the flywheel for relative movement in a circumferential direction through an elastic member, the holder supporting the clutch shoe; and a stopper structure provided between the flywheel and the holder for transmitting a rotational force of the combustion engine to the holder.

According to the construction, the clutch shoe is supported by the holder capable of undergoing a relative movement in the circumferential direction through the elastic element relative to the flywheel and, therefore, the force acting in the torsional direction between the drive shaft for driving the load and the rotary shaft of the combustion is absorbed by the elastic element, thus suppressing the torsional vibration occurring in the drive shaft. Also, since the clutch shoe is supported by the holder fitted to the flywheel, not by a fixing element of the flywheel, there is no possibility that the fixing element of the flywheel may be loosened by the force acting in the torsional direction.

In a preferred embodiment of the present invention, the torsional vibration damper equipped clutch further may include a receptacle defined in the holder for accommodating therein the elastic element, and an urging member fixed to the flywheel for urging the elastic element in a circumferential direction towards an inner surface of the receptacle. According to this feature, the elastic element is accommodated within the receptacle of the holder and, therefore, the elastic element can be disposed with a simplified structure.

In another preferred embodiment of the present invention, where the elastic element is accommodated within the receptacle, the use may be made of a covering body for preventing the elastic element from falling out of the receptacle. The use of the covering body is effective to avoid an undesirable fall of the elastic element out of the receptacle under the influence of vibrations of the combustion engine and/or external vibrations.

Where the covering body is employed as described above, the urging member may be a shoulder bolt threadingly connected with the flywheel and the holder is supported by a head portion of the shoulder bolt. In this case, the covering body is retained between the head portion of the shoulder bolt and the holder. According to this feature, since both of the holder and the covering body are supported by the shoulder bolt, the covering body can be retained with a simplified structure.

Where the shoulder bolt is employed as the urging member, the shoulder bolt may include an elastic member that is compressed in an axial direction of the shoulder bolt at a location between the head portion of the shoulder bolt and the holder. According to this feature, since the covering body, when contacting the holder, functions as a frictional damper acting in the circumferential direction on the relative movement between the holder and the flywheel through the shoulder bolt, the torsional vibration can be further suppressed.

Where the covering body is employed as described above, the urging member referred to above may be a shoulder bolt threadingly connected with the flywheel, in which case the holder is supported by the head portion of the shoulder bolt and, at the same time, the use is made of a wave spring washer, which is compressed in an axial direction of the shoulder bolt at a location between the head portion of the shoulder bolt and the holder, and a fastening member for fitting the covering body to the holder. According to this feature, during the maintenance and servicing of the elastic element, removal of the fastening member, without removal of the shoulder bolt, allows the removal of the covering body from the holder and, accordingly, the maintenance and servicing of the elastic element can be facilitated.

In a still further preferred embodiment of the present invention, an outer peripheral surface of the holder may be engaged with a holding surface, which is provided in the flywheel so as to be oriented radially inwardly, in a fashion relatively immovably in a radial direction. According to this feature, not only can it be possible to avoid an undesirable axial movement of the holder under the influence of vibrations, induced by the rotation of the combustion engine, and/or external vibrations, but also the alignment of the holder during the assemblage can be facilitated.

Any combination of at least two structures disclosed in the claims and/or the specification and/or the accompanying drawings is to be construed as included within the spirit of the present invention. In particular, any combination of two or more claims set forth in the appended claims is to be construed as included within the spirit of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Some preferred embodiments of the present invention will now be described in detail with reference to the accompanying drawings.

Figure 1:
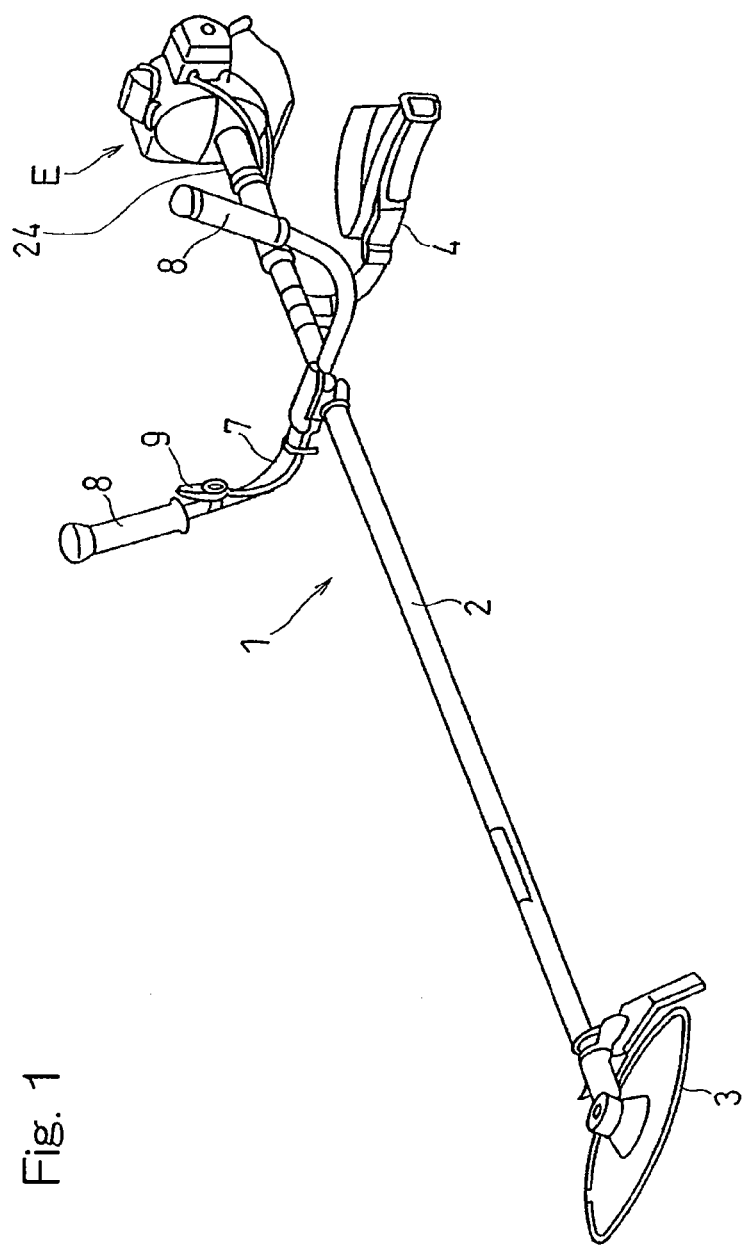
FIG. 1 is a perspective view showing a brush cutter having mounted thereon an combustion engine of a type equipped with a torsional vibration damper equipped clutch in accordance with a first preferred embodiment of the present invention.
Figure 2:
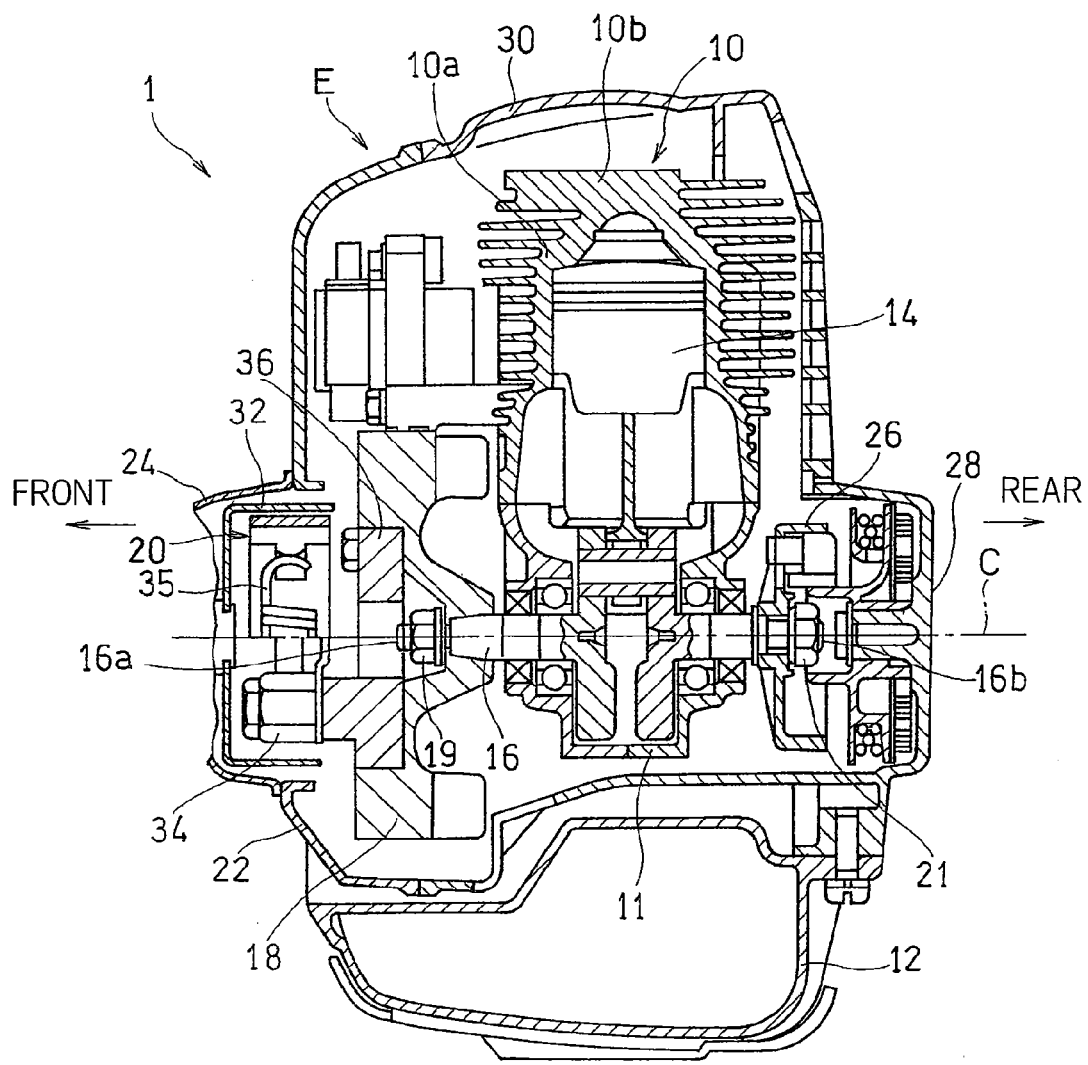
FIG. 2 is a longitudinal sectional view of the combustion engine shown in FIG. 1.
Figure 3:
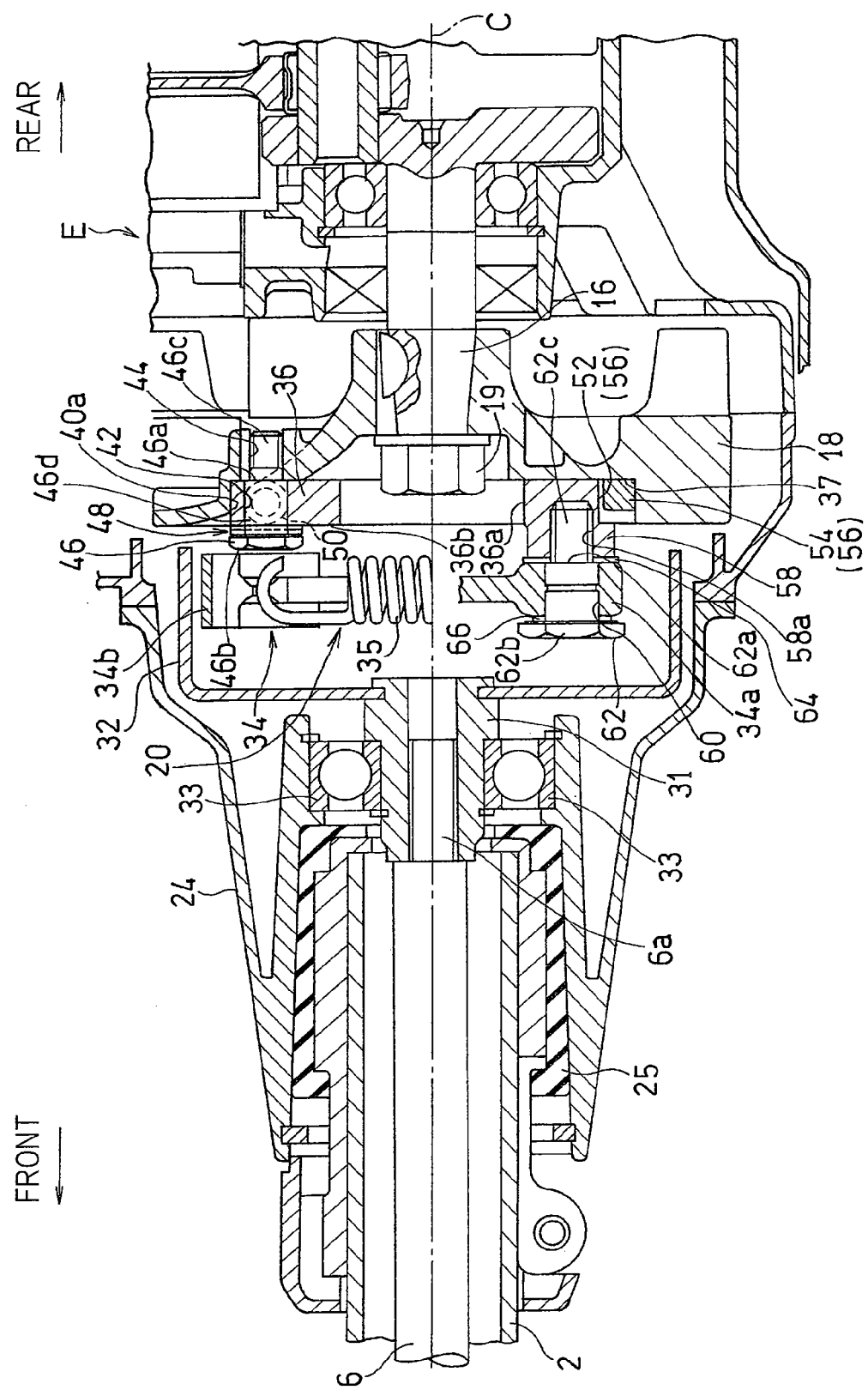
FIG. 3 is a longitudinal sectional view showing, on an enlarged scale, an important portion of the combustion engine in the vicinity of a clutch shown in FIG. 2.

Referring first to FIGS. 1 to 4, there is shown a brush cutter 1, which is one of portable work machines and which has a compact combustion engine E equipped with a damper equipped clutch designed in accordance with a first preferred embodiment of the present invention. The illustrated brush cutter 1 has the combustion engine E fitted to a base end portion of an elongated metallic main tube 2 made of, for example, an aluminum alloy and also has a rotary cutter blade 3 fitted as a work tool to a free end of the main tube 2 remote from the combustion engine E. The main tube 2 has a hollow defined therein over the length thereof, and a drive shaft 6 made of, for example, iron is drivingly inserted within the hollow of the main tube 2 as best shown in FIG. 3. The drive shaft 6 has an proximal end 6a drivingly coupled with the combustion engine E through a clutch 20, as will be detailed later, and also has a distal end drivingly connected with the rotary cutter blade 3 as best shown in FIG. 1. The main tube 2 is provided with a shoulder strap 4 and a generally U-shaped handlebar 7. The attendant worker can carry the brush cutter 1 with the shoulder strap 4 hung around his or her shoulder and can handle the brush cutter 1 with grips 8 at opposite end portions of the U-shaped handlebar 7 held by respective hands of the attendant worker. As a matter of course, cutting of brushes and/or hogweeds, for example, is accomplished when the brush cutter 1 with its combustion engine driven is swung to allow the rotary cutter blade 3 to sweep the brushes and/or hogweeds as is well known to those skilled in the art. The rotational speed of the cutter blade 3 is adjusted by manipulating a throttle lever 9 mounted on a portion of the handlebar adjacent one of the grips 8.

The combustion engine E so far shown and described is, for example, a two cycle combustion engine and includes, as best shown in FIG. 2, a cylinder assembly 10, in which a cylinder block 10a and a cylinder head 10b are formed integrally with each other, and a crankcase 11 secured from below to the cylinder block 10a to complete an engine body. It is, however, to be noted that the cylinder assembly 10 referred to above may be of two piece construction including the cylinder block 10a and the cylinder head 10b that are separate from each other, but are firmly coupled with each other. A fuel tank 12 is positioned beneath the crankcase 1.

It is also to be noted that although reference has been made to the two-stroke cycle combustion engine, a four-stroke cycle combustion engine may be employed for the combustion engine E.

The cylinder block 10a of the cylinder assembly 10 has a cylindrical bore defined therein, in which a reciprocating piston 14 is accommodated therein for a reciprocal movement in a direction axially thereof and is drivingly connected at one end thereof with a crankshaft 16 that is rotatably supported within the crankcase 11. The crankshaft 16 is a rotary shaft of the combustion engine E and has its opposite, front and rear end portions 16a, 16b each formed with male helical threads. A flywheel 18, which concurrently serves as a cooling fan, is inserted through one of the helically threaded end portions of the crankshaft 16, that is, the front end portion 16a thereof and is fixedly connected therewith for rotation together with the engine output shaft 16. Thus, the flywheel 18 is fixed to the crankshaft 16 by means of a fastening nut 19, or a fixing element, firmly threaded onto a portion of the helically threaded front end portion 16a in a relatively non-rotatable fashion with each other. The torsional vibration damper equipped clutch 20, that is, the clutch having a torsional vibration damper built therein, is fitted to the flywheel 18 for transmitting an output drive of the combustion engine E to the drive shaft 6, best shown in FIG. 3, of the brush cutter 1 (FIG. 1).

As best shown in FIG. 2, the flywheel 18 concurrently serving as the cooling fan is enclosed within a fan housing 22 secured to the crankcase 11, and the fan housing 22 is in turn mounted on the proximal end portion, or the rear end portion, of the main tube 2 (FIG. 1) through a clutch housing 24. The rear end portion 16b of the crankshaft 16 has a starter pulley 26 mounted thereon and fixed thereto by means of a fastening member 21 such as, for example, an internally threaded nut threaded onto the male helical thread on the rear end portion 16b of the crankshaft 16. A recoil starter 28 is disposed outwardly of the starter pulley 26 for driving the crankshaft 16 through the starter pulley 26 at the time of start of the combustion engine E in any manner known to those skilled in the art. A shroud 30 made of a resinous material for enclosing an upper half of the combustion engine E inclusive of the cylinder assembly 10 is secured in part to the fan housing 22 and in part to the crankcase 11 by means of bolts not shown.

The torsional vibration damper equipped clutch 20 employed in the practice of the first preferred embodiment will now be described in detail. As best shown in FIG. 3, the torsional vibration damper equipped clutch 20 is a centrifugal clutch including a clutch drum 32, coupled rigidly with the cutter blade 3 (best shown in FIG. 1) through the drive shaft 6 within the main tube 2, and a pair of clutch shoes 34 connected rigidly with the crankshaft 16 and adapted to be frictionally connected with the clutch drum 32 by the effect of a centrifugal force to thereby transmit the drive of the combustion engine E to the drive shaft 6. Those clutch shoes 34 are positioned on respective sides of the longitudinal axis C of the crankshaft 16 to assume a symmetrical arrangement about the longitudinal axis C.

The clutch drum 32 is of a generally bowl-like shape opening in a direction axially rearwardly of the drive shaft 6, that is, in a rightward direction as viewed in FIG. 3 and is made up of a bottom wall, which is connected with the drive shaft 6 through a coupling shaft 31 for rotation together therewith, and a flanged wall substantially or generally perpendicular to the bottom wall and protruding axially therefrom towards the clutch shoes 34. The coupling shaft 31 is supported by the clutch housing 24 through a bearing 33 for rotation relative to the clutch housing 24, and the proximal end portion 6a of the drive shaft 6 is inserted into the hollow of the coupling shaft 31 and splined thereto so that the clutch drum 32 can not be rotatable together with the drive shaft 6 through the coupling shaft 31. A damper 25 made of a rubber material is disposed within the clutch housing 24 for suppressing a vibration taking place in the main tube 2. It is eventually pointed out that the torsional vibration damper equipped clutch 20, the coupling shaft 31 and the drive shaft 6 are arranged in a fashion substantially coaxial with each other about the longitudinal axis C referred to previously.

Each of the clutch shoes 34 is of a structure including a leg 34a supported by the flywheel 18 by means of a structure as will be described later, a coupling portion 34b adapted to be moved radially outwardly by the effect of the centrifugal force to engage the clutch drum 32, particularly the axially protruding flanged wall of the clutch drum 32, and a clutch spring 35 connecting between the leg 34a and the coupling portion 34b for applying a spring force necessary to urge the coupling portion 34b in a direction radially inwardly. The leg 34a of each clutch shoe 34 is connected with the flywheel 18 through a metallic floating holder 36 made of a metallic material such as, for example, an aluminum alloy. It is, however, to be noted that the material for the holder 36 may not be necessarily limited to the aluminum alloy.

Figure 4:
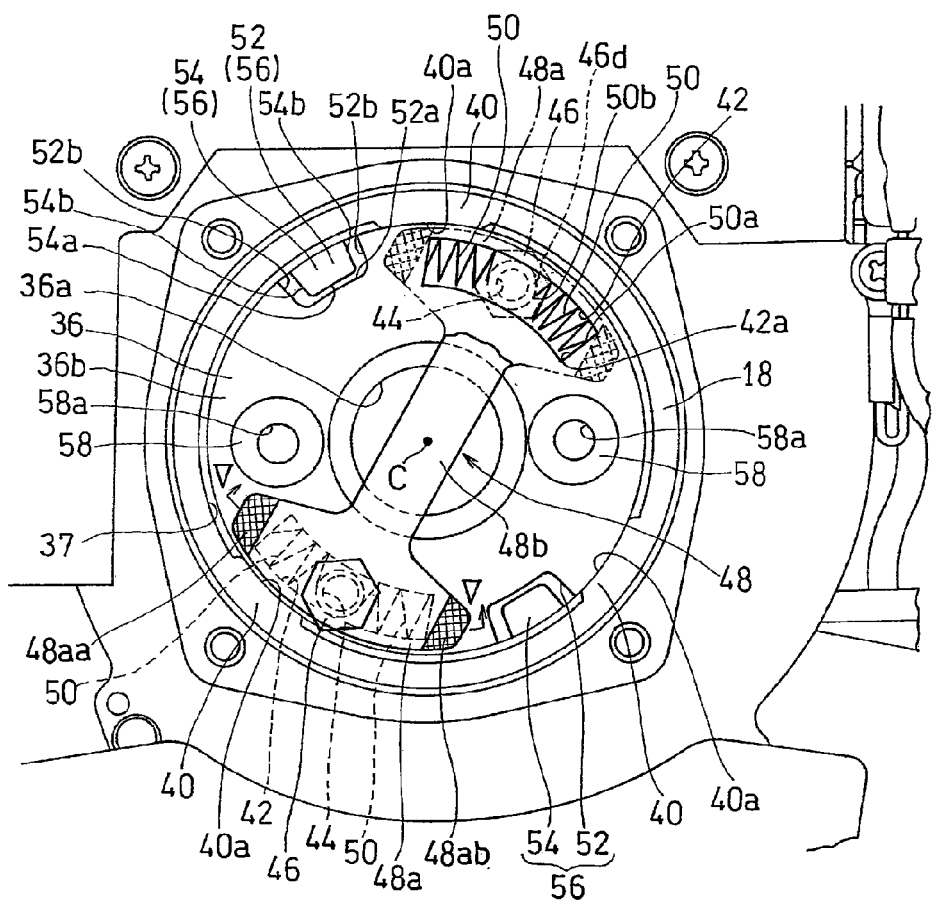
FIG. 4 is a rear view showing the clutch as viewed from a load side.

As best shown in FIG. 4, the holder 36 has a substantially round shape when viewed in a direction conforming to the longitudinal axis C of the crankshaft 16 (FIG. 3), and has a throughhole 36a defined therein at a center portion thereof. This holder 36 is accommodated within a holder accommodating recess 37 defined in a front surface region of the flywheel 18. The holder accommodating recess 37 is integrally formed with a plurality of, for example, three, radially inwardly extending holding portions (tight fitting or mating portions) 40. Those holding portions 40 are equidistantly spaced from each other in a direction circumferentially of the holder 36, and the holder 36 has its outer peripheral surface engaged within holding surfaces 40a, which are formed in the respective holding portions 40 so as to confront radially inwardly to the holder 36, so that the holder 36 will not move relative thereto. It is to be noted that the number of the holding portions 40 may not be necessarily limited to three such as shown and described, but it may be two or four or more, and that the holding surface 40a may be constituted by the entire inner peripheral surface of the holder accommodating recess 37.

Arcuate receptacles 42 each in the form of an arcuate slit are defined in respective portions of the holder 36 adjacent the outer periphery thereof in a fashion coaxial with the longitudinal axis C, i.e., the axis of rotation, of the crankshaft 16. Each of those arcuate receptacles 42 is in the form of a circumferentially extending elongated hole perforated completely through the wall defining the holder 36 in the axial direction, and those arcuate receptacles 42 are arranged at respective positions symmetrical with respect to the longitudinal axis C of the crankshaft 16. It is, however, to be noted that the number of the receptacles 42 may not be necessarily limited to two such as shown and described, and three or more receptacles may be employed. It is also to be noted that each of the receptacles 42 may not be necessarily perforated completely through the wall defining the holder 36, but may be in the form of a depression defined so as to open in a front surface region of the holder 36.

The holder accommodating recess 37 defined in the flywheel 18 as described previously has a bottom wall formed with screw holes 44 that are arranged at respective positions symmetrical with respect to the longitudinal axis C. In a condition in which the holder 36 is mounted inside the holder accommodating recess 37 in the flywheel 18, each of those screw holes 44 is so formed in a bottom wall of the holder accommodating recess 17 at a position corresponding to a point substantially intermediate of the length of the associated arcuate receptacle 42 in the holder 36.

As best shown in FIG. 3, a stepped screw or a shoulder bolt 46, which serves as an urging member, is inserted into each of the arcuate receptacle 42 in the holder 36 and is then firmly threaded into the corresponding screw hole 44 in the flywheel 18 to allow a radially outwardly stepped portion 46a of the respective shoulder bolt 46 to be held in abutment with a bottom surface of the holder accommodating recess 37. A covering body 48 (FIG. 4) as will be detailed later, is held between a head 46b of each of the shoulder bolts 46 and a front surface 36b of the holder 36, and the holder 36 is fitted to the flywheel 18 in a floating condition by the effect of an elastic urging force of the covering body 48. In fitting the holder 36 to the flywheel 18, care must be taken that the holder 36 should not be axially firmly fastened by the elastic urging force of the covering body 48 to such an extent as to make the holder 36 to be immovable in the axial direction, but should be so fastened to such an extent as to enable the holder 36 to be somewhat movable relative to the flywheel 18 in the axial direction.

In a condition in which each of the shoulder bolts 46 has been fastened into the respective threaded hole 44, a major portion of a large diameter portion 46d of the respective shoulder bolt 46 intermediate between the head portion 46b thereof and a threaded portion 46c thereof is positioned inside the associated arcuate receptacle 42 in the holder 36. A pair of helical compression springs 50, best shown in FIG. 4 and serving as an elastic member, are accommodated within the remaining portion of each of the arcuate receptacles 42. In each of the arcuate receptacles 42, the helical compression springs 50, each having opposite ends 50a and 50b, are interposed in a compressed state within halves of the corresponding arcuate receptacle 42 on respective sides of the associated shoulder bolt 46, with the one end 50a held in contact with a circumferential end face 42a of the corresponding arcuate receptacle 42 and with the other end 50b held in contact with the large diameter portion 46b of the associated shoulder bolt 46.

With the helical compression springs 50 positioned within each of the arcuate receptacles 42 in the manner described above, the elastic urging forces are applied to the associated shoulder bolt 46 in the circumferential direction. In other words, the holder 36 is coupled with the flywheel 18 through the helical compression springs 50 for movement relative thereto in the circumferential direction. In this way, each of the shoulder bolts 46 concurrently serves as a support member for supporting the flywheel 18 and the urging member for urging the helical compression springs 50 in the circumferential direction.

Respective areas forwardly of the arcuate receptacles 42 are covered with the covering body 48 employed to prevent the helical compression springs 50 from falling out of the corresponding arcuate receptacles 42. This covering body 48 is prepared from a metallic plate and is so formed as to have two major covering portions 48a, 48a and a bridge portion 48b connecting between the major covering portions 48a, 48a. The covering body 48 may be of any suitable shape, provided that undesirable fall-out of the helical compression springs 50 can be avoided, and, therefore, the shape thereof may not be necessarily limited to that shown and described.

Figure 5:
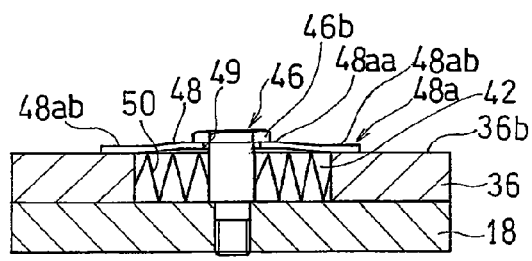
FIG. 5 is a cross sectional view taken along the line V-V in FIG. 4.

Referring particularly to FIG. 5, the covering body 48 has a circumferential section so shaped as to be curved in a direction axially of the shoulder bolt 46. In other words, the covering body 48 functions as an elastic member that is compressed in the axial direction of the shoulder bolt 46, that is, in a direction parallel to the longitudinal axis C (FIG. 4) between the head portion 46b of the shoulder bolt 46 and the holder 36. More specifically, an intermediate portions 48aa of each of the covering portions 48a, 48a intermediate of the length of such covering portion 48a is protruding in a direction away from the holder 36, with a respective throughhole 49 defined in that intermediate portion 48aa for the passage of the threaded portion 46c and the large diameter portion 46d of the shoulder bolt 46. Opposite end portions 48ab of each of the covering portions 48a, 48a are urged against the front surface 36b of the holder 36 to allow the covering body 48 to assume a surface contact between the holder 36 and the flywheel 18 through the corresponding shoulder bolt 46 so that the covering body 48 can function as a frictional damper between the holder 36 and the flywheel 18. The opposite end portions 48ab undergoing the surface contact referred to above are shown as cross-hatched in FIG. 4.

As best shown in FIG. 4, radially inwardly extending cutouts 52 are formed in the outer peripheral surface of the holder 36 at two locations that specifically lie on respective sides symmetrical with respect to the longitudinal axis C. On the other hand, the flywheel 18 is integrally formed with two projections 54 so as to protrude axially forwardly from the bottom surface of the holder accommodating recess 37 into the respective cutouts 52 in the holder 36. As a matter of design, those projections 54 also lie on respective sides symmetrical with respect to the longitudinal axis C.

In an assembled condition with the holder 36 fitted to the flywheel 18, inner diametric wall faces 54a, confronting radially inwardly of the associated projections 54, and peripheral end faces 54b, 54b, oriented circumferentially thereof, are respectively opposed to bottom faces 52a and side faces 52b, 52b, which define the corresponding cutouts 52 in the holder 36 with a gap therebetween. Prior to the helical compression springs 50 being compressed axially inwardly thereof to have the minimum length, one of the peripheral wall faces 54b, 54b of the projections 54 and one of the side faces 52b, 52b of the cutouts 52 in the holder 36 are held in contact with each other to thereby transmit the rotary drive force of the combustion engine E to the holder 36. In this way, the projections 54 of the flywheel 18 and the cutouts 52 in the holder 36 cooperate with each other to define a stopper structure 56 which transmit the rotational drive force to the holder 36 when the projections 54 and the holder 36 are engaged with each other before the helical compression springs 50 are completely inwardly compressed.

Also, the holder 36 is formed integrally with axially forwardly projecting bosses 58, and each of those bosses 58 has a threaded blind hole 58a defined therein so as to open axially forwardly. The bosses 58 are also defined at respective positions symmetrical with respect to the longitudinal axis C. As best shown in FIG. 3, fastening members 62 each having a threaded portion 62c are inserted into respective bolt insertion holes 60, formed in the associated legs 34a of the clutch shoes 34, with the threaded portions 62c thereof firmly fastened into the threaded holes 58a in the bosses 58 to thereby cause the holder 36 to support the clutch shoes 34. In the embodiment now under discussion, shoulder bolts are used as the fastening members 62, and a flat washer 64 is interposed between a stepped portion 62a of the respective shoulder bolt 62 and the associated boss 58 while a wave spring washer 66 is interposed between a head portion 62b of the respective shoulder bolt 62 and the leg 34a.

Hereinafter, the operation of the torsional vibration damper equipped clutch 20 designed in accordance with the previously described embodiment will be described. Assuming that the combustion engine E shown in FIG. 2 is started, the crankshaft 16, the flywheel 18 fixed thereto, the holder 36 coupled with the flywheel 18 and the clutch shoes 34 supported by the holder 36 rotate. As the rotational speed of the combustion engine E increases, the centrifugal force developed in the clutch shoes 34 increases and the bridge portion 34b approaches and is then engaged with the clutch drum 32 against the biasing force exerted by the clutch spring 35, thus bringing the clutch into an engaged position.

As the clutch 20 is brought into the engaged position in the manner described above, the rotational drive force of the crankshaft 16 is transmitted through the clutch to the drive shaft 6 shown in FIG. 3 on one hand and, on the other hand, a load from the cutter blade 3 is imposed on the combustion engine E, resulting in a reduction in rotational speed of the combustion engine E and the clutch tending to disengage. Even in this condition, the cutter blade 3 continues its rotation by the effect of an inertia force. Once the clutch is eventually disengaged, the rotation of the cutter blade 3 (FIG. 1) is gradually lowered, and the rotational speed of the combustion engine E increases again to allow the clutch to start engaging.

If the clutch undergoes a repetition of alternate engagement and disengagement in the manner described above, a change occurs in the rotational speed of the engine E and also in torque and, by the inertia effect between the flywheel 18 (FIG. 2) of the combustion engine E and the cutter blade 3, a force acting in a torsional direction, in which a rotation in one direction and a reversed rotation in the other direction are periodically repeated, acts on the drive shaft 6 and the clutch drum 32, both best shown in FIG. 3, through which the combustion engine E and the cutter blade 3 are connected together. Although the force acting in the torsional direction referred to above is transmitted to the holder 36 through the clutch shoes 34, such force is absorbed by the helical compression springs 50 interposed between the holder 36 and the flywheel 18 and is, therefore, not transmitted to the crankshaft 16. Also, the opposite end portions 48ab of the covering portion 48a of the covering body 48 shown in FIG. 4, which are opposed to each other in the peripheral direction, functions as the frictional damper for damping a relative movement in a rotational direction between the holder 36 and the flywheel 18 through the shoulder bolts 52.

Further, when the rotational speed increases, the number of revolutions of the clutch shoes 34 shown in FIG. 3 is also increased with the clutch 20 consequently brought into a completely engaged position and, as a result, one of the peripheral wall faces 54b, 54b of the projections 54 integral with the flywheel 18, best shown in FIG. 4, are brought into engagement with one of the side faces 52b, 52b of the cutouts 52 in the holder 36 and, therefore, the rotational drive force of the combustion engine E is assuredly transmitted to the holder 36. In this way, the cutter blade 3 shown in FIG. 1 is driven at a high speed through the clutch 20 and then through the drive shaft 6.

In the clutch 20 of the construction described hereinabove, since the holder 36 is supported for movement in the circumferential direction relative to the flywheel 18 through the helical compression springs 50 and the clutch shoes 34 shown in FIG. 3 are supported by the holder 36, the force acting in the torsional direction, which acts between the drive shaft 6 operable to drive the cutter blade 3 (FIG. 1) and the crankshaft 16, is absorbed by the helical compression springs 50 and, therefore, the torsional vibration can be suppressed from occurring in the drive shaft 6. Also, since the clutch shoes 34 are supported by the holder 36 fitted to the flywheel 18, not by the nuts 19, which are fixing elements of the flywheel 18, there is no possibility that the nuts 19 may be loosened by the action of the force acting in the torsional direction.

Since as best shown in FIG. 4, the arcuate receptacles 42 are provided in the holder 36 with the helical compression springs 50 accommodated therein and since the helical compression springs 50 are urged in the circumferential direction to engage the inner faces of the arcuate receptacles 42 by the shoulder bolts 46 fixed to the flywheel 18, the helical compression springs 50 are snugly accommodated within the arcuate receptacles 42 in the holder 36 and, therefore, the helical compression springs 50 can be arranged with a simplified structure.

Also, since the use is made of the covering body 48 for avoiding an undesirable fall of the helical compression springs 50 out of the arcuate receptacles 42, it is possible to avoid the possibility that the helical compression springs 50 may fall out of the arcuate receptacles 42 under the influence of vibrations, induced by the revolution of the combustion engine E, and/or external vibrations.

Since as best shown in FIG. 3 the holder 36 is supported by the head portions 46b of the shoulder bolts 46 with the covering body 48 supported between those head portions 46b and the holder 36, both of the holder 36 and the covering body 48 are supported by those shoulder bolts 46 and, hence, the covering body 48 can be retained with a simplified structure.

Also, since the covering body 48 functions as an elastic element that is compressed in the axial direction of each of the shoulder bolts 46 at a location between each of the head portions 46b of the shoulder bolts 46 and the holder 36, it functions between the holder 36 and the flywheel 18 through the respective shoulder bolt 46 as a frictional damper relative to the relative movement in the circumferential direction, when the peripheral ends 48ab of the covering portions 48a of the covering body 48 are brought into contact with the holder 36. Accordingly, the torsional vibration can be further suppressed.

Since as best shown in FIG. 4 the outer peripheral surface of the holder 36 is engaged with the radially inwardly oriented holding surface 40a, provided in the flywheel 18, in a fashion relatively immovable in the radial direction, not only can it be possible to avoid an undesirable axial movement of the holder 36 under the influence of vibrations, induced by the rotation of the combustion engine, and/or external vibrations, but also the alignment of the holder 36 during the assemblage can be facilitated.

Figure 6:
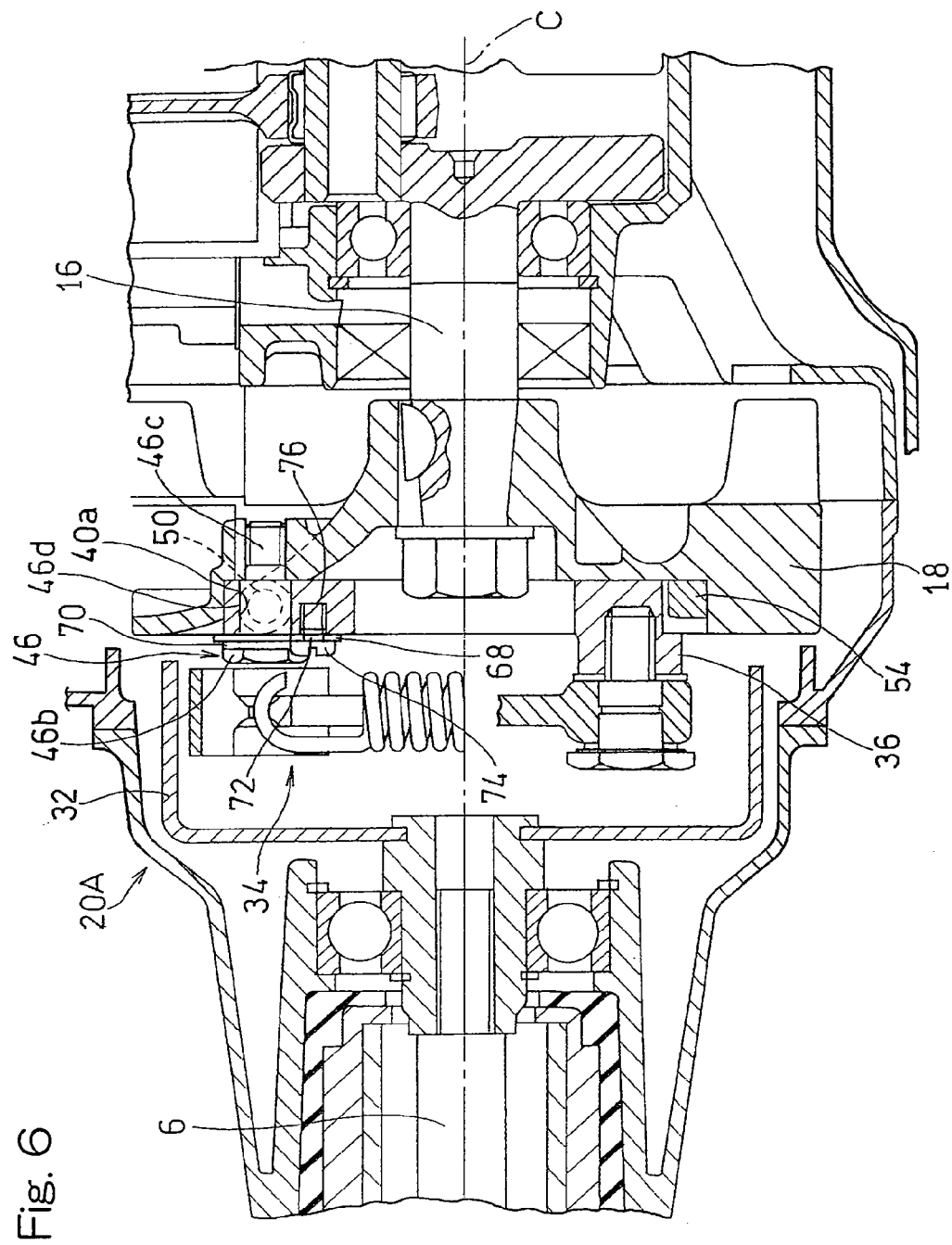
FIG. 6 is a longitudinal sectional view showing, on an enlarged scale, the torsional vibration damper equipped clutch designed in accordance with a second preferred embodiment of the present invention.
Figure 7:
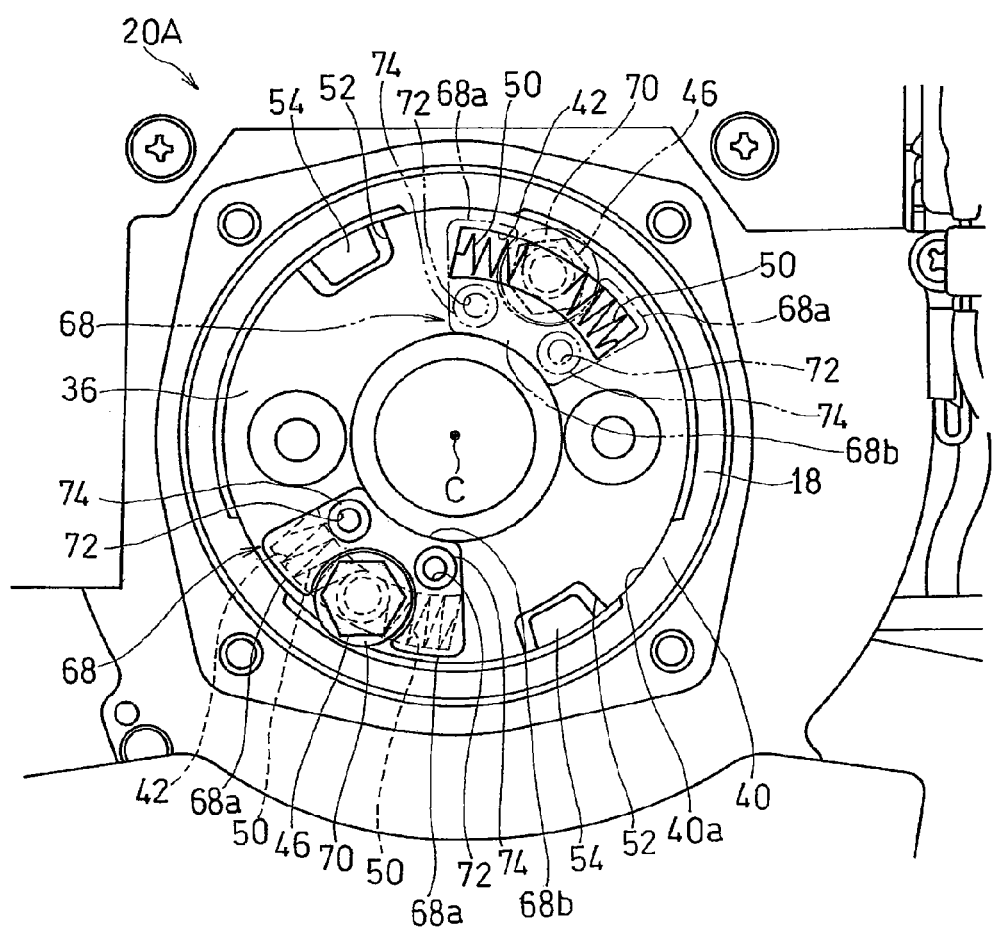
FIG. 7 is a rear view of the clutch of FIG. 6 as viewed from the load side.

FIG. 6 illustrates a fragmentary longitudinal sectional view showing the combustion engine utilizing the torsional vibration damper equipped clutch 20A designed in accordance with a second preferred embodiment of the present invention, and FIG. 7 illustrates a front elevational view of the torsional vibration damper equipped clutch 20A as viewed from the load side. As shown in FIG. 7, the torsional vibration damper equipped clutch 20A according to this second embodiment is substantially similar to the torsional vibration damper equipped clutch 20 designed according to the previously described first embodiment, but differs therefrom in respect of the use of separate covering bodies 68 and 68 used to cover the two arcuate receptacles 42 that are opposed to each other in the radial direction of the holder 36 and the use of a wave spring washer 70, which is an elastic member that is compressed in the axial direction of the respective shoulder bolt 46, at a location between each of the head portions 46b of the shoulder bolts 46 and the holder 36. The wave spring washer 70 has a wavy shape curved in the axial direction and has an elastic force acting in the axial direction. This wave spring washer 70 has an outer diameter somewhat greater than the maximum outer diameter of the head portion 46b of the respective shoulder bolt 46 and also has an inner diameter somewhat greater than the outer diameter of the large diameter portion 46d of the respective shoulder bolt 46.

Each of the covering bodies 68 and 68 is of a U-shaped configuration opening in the radially outward direction and has two arms 68a and 68a that are spaced so as to encompass half or more of the outer circumference of the corresponding wave spring washer 70 with the head portion 46b of the respective shoulder bolt 46 and the associated wave spring washer 70 accommodated within the space between the arms 68a and 68a. Accordingly, the area forwardly of each of the arcuate receptacles 42 is covered by the two arms 68a and 68a of the associated covering body 68 and the wave spring washer 70.

A connecting portion 68b of each of the U-shaped covering body 68, which bridges between the two arms 68a and 68a, is formed with two insertion holes 72 and, as best shown in FIG. 6, when a fastening member 74 such as, for example, a screw member is inserted through each of those insertion holes 72 and is then firmly tapped into a covering fitting threaded hole 76, defined in the front end face of the holder 36, the respective covering body 68 is supported by the holder 36.

Even in the second preferred embodiment, since the force acting in the torsional direction, which is generated in the clutch drum 32 in a manner similar to that described in connection with the first embodiment, is absorbed by the helical compression springs 50, generation of the torsional vibration in the clutch drum 32 can be suppressed. Also, since according to the above described second embodiment, during the maintenance and servicing of the helical compression springs 50, removal of the small fastening members 74, without removal of the large shoulder bolts 46, allows the removal of the covering bodies 68 from the holder 36 to facilitate removal of the helical compression springs 50, the maintenance and servicing of the helical compression springs 50 can be facilitated. Also, although the two covering bodies 68 and the two wave spring washers 70 are required in the practice of the second embodiment, attention is called that the covering body 68 employed in the second embodiment suffices to be smaller than the covering body 48 employed in the previously described first embodiment.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in each of the embodiments hereinbefore fully described the helical compression springs 50 have been shown and described as employed for the elastic members, a rubber having a high heat resistance, such as, for example, silicone rubber may be employed in place of each of the helical compression springs 50.

Accordingly, such changes and modifications are, unless they depart from the scope of the present invention as delivered from the claims annexed hereto, to be construed as included therein.

REFERENCE NUMERALS

3 . . . Cutter blade (Load)
6 . . . Drive shaft
16 . . . Crankshaft (Rotary shaft)
18 . . . Flywheel
19 . . . Nut (Fixing element)
20, 20A . . . Torsional vibration damper equipped clutch
32 . . . Clutch drum
34 . . . Clutch shoe
36 . . . Holder
40a . . . Retaining surface
42 . . . Arcuate receptacle
46 . . . Shoulder bolt (Urging member)
46b . . . Head portion
48 . . . Covering body (Elastic member)
50 . . . Helical compression spring (Elastic member)
56 . . . Stopper structure
68 . . . Covering body
70 . . . Wave spring washer (Elastic element)
74 . . . Fastening member
E . . . Combustion engine

What is claimed is:

1. A torsional vibration damper equipped clutch for a combustion engine, which comprises:
   a clutch drum coupled with a load through a drive shaft;
   a clutch shoe connected with a rotary shaft of the combustion engine and capable of being connected with the clutch drum by the effect of a centrifugal force;
   a flywheel fixed to the rotary shaft by means of a fixing member;
   a holder connected with the flywheel for relative movement in a circumferential direction through an elastic element, the holder supporting the clutch shoe;
   a stopper structure provided between the flywheel and the holder for transmitting a rotational force of the combustion engine to the holder;
   a receptacle defined in the holder for accommodating therein the elastic element;
   a covering body for preventing the elastic element from falling out of the receptacle; and
   an urging member fixed to the flywheel for urging the elastic element in a circumferential direction towards an inner surface of the receptacle, wherein
   the urging member is a shoulder bolt threadingly connected with the flywheel, and the holder is supported by a head portion of the shoulder bolt.

2. The torsional vibration damper equipped clutch as claimed in claim 1, wherein the covering body is retained between the head portion of the shoulder bolt and the holder.

3. The torsional vibration damper equipped clutch as claimed in claim 2, in which the covering body comprises an elastic member that is compressed in an axial direction of the shoulder bolt at a location between the head portion of the shoulder bolt and the holder.

4. The torsional vibration damper equipped clutch as claimed in claim 1, in which an outer peripheral surface of the holder is engaged with a holding surface, which is provided in the flywheel so as to be oriented radially inwardly, in a fashion relatively immovably in a radial direction.

5. A combustion engine equipped with the torsional vibration damper equipped clutch as defined in claim 1.

6. A brush cutter equipped with the combustion engine as defined in claim 5.

7. The torsional vibration damper equipped clutch as claimed in claim 1 further comprising a wave spring washer, which is compressed in an axial direction of the shoulder bolt at a location between the head portion of the shoulder bolt and the holder, and a fastening member for fitting the covering body to the holder.

8. A torsional vibration damper equipped clutch for a combustion engine, to drive a handheld work machine which comprises:
   a clutch drum coupled with a load through a drive shaft;
   a clutch shoe connected with a rotary shaft of the combustion engine and capable of being connected with the clutch drum by the effect of a centrifugal force;
   a flywheel fixed to the rotary shaft by means of a fixing member;
   a holder connected with the flywheel for relative movement in a circumferential direction through an elastic element, the holder supporting the clutch shoe;
   a stopper structure provided between the flywheel and the holder for transmitting a rotational force of the combustion engine to the holder;
   a receptacle defined in the holder for accommodating therein the elastic element;
   an urging member fixed to the flywheel for urging the elastic element in a circumferential direction towards an inner surface of the receptacle to store energy and absorb fluctuations of force in the elastic element;
   a covering body maintaining the elastic element within the receptacle wherein the urging member also retains the covering body on the holder and the urging member is a bolt connected to the flywheel and the elastic element is a helical compression spring mounted respectively to extend on separate sides of the bolt in the receptacle.

9. The torsional vibration damper equipped clutch as claimed in claim 8, in which an outer peripheral surface of the holder is engaged with a holding surface, which is provided in the flywheel so as to be oriented radially inwardly, in a manner relatively immovably in a radial direction.

10. A combustion engine equipped with the torsional vibration damper equipped clutch as defined in claim 8.

11. A brush cutter equipped with the combustion engine as defined in claim 10.

12. A torsional vibration damper equipped clutch for a combustion engine, to drive a handheld work machine which comprises:
   a clutch drum coupled with a load through a drive shaft;
   a clutch shoe connected with a rotary shaft of the combustion engine and capable of being connected with the clutch drum by the effect of a centrifugal force;
   a flywheel fixed to the rotary shaft by means of a fixing member;
   a holder connected with the flywheel for relative movement in a circumferential direction through an elastic element, the holder supporting the clutch shoe;
   a stopper structure provided between the flywheel and the holder for transmitting a rotational force of the combustion engine to the holder;
   a receptacle defined in the holder for accommodating therein the elastic element;
   an urging member fixed to the flywheel for urging the elastic element in a circumferential direction towards an inner surface of the receptacle to store energy and absorb fluctuations of force in the elastic element; and
   a covering body maintaining the elastic element within the receptacle wherein the urging member also retains the covering body on the holder, in which the urging member is a shoulder bolt threadingly connected with the flywheel, and
   in which the holder is supported by a head portion of the shoulder bolt and the covering body is retained between the head portion of the shoulder bolt and the holder.

13. The torsional vibration damper equipped clutch as claimed in claim 12 in which the covering body comprises an elastic member that is compressed in an axial direction of the shoulder bolt at a location between the head portion of the shoulder bolt and the holder.

14. A combustion engine equipped with the torsional vibration damper equipped clutch as defined in claim 12.

15. A brush cutter equipped with the combustion engine as defined in claim 14.

16. The torsional vibration damper equipped clutch as claimed in claim 12 further comprising a wave spring washer, which is compressed in an axial direction of the shoulder bolt at a location between the head portion of the shoulder bolt and the holder, and a fastening member for fitting the covering body to the holder.

* * * * *